United States Patent
Wu et al.

(10) Patent No.: US 10,045,097 B2
(45) Date of Patent: Aug. 7, 2018

(54) METHOD FOR UPLOADING DATA OF CELL PANEL MONITORING SYSTEM AND CELL PANEL MONITORING SYSTEM

(71) Applicant: Sungrow Power Supply Co., Ltd., Hefei, Anhui (CN)

(72) Inventors: Jing Wu, Anhui (CN); Lei Liu, Anhui (CN); Jun Wang, Anhui (CN)

(73) Assignee: SUNGROW POWER SUPPLY CO., LTD., Hefei (CN)

( * ) Notice: Subject to any disclaimer, the term of this patent is extended or adjusted under 35 U.S.C. 154(b) by 0 days.

(21) Appl. No.: 15/413,035

(22) Filed: Jan. 23, 2017

(65) Prior Publication Data

US 2017/0238074 A1    Aug. 17, 2017

(30) Foreign Application Priority Data

Feb. 17, 2016    (CN) .......................... 2016 1 0091788

(51) Int. Cl.
*H04Q 9/14*    (2006.01)
*H02S 50/10*    (2014.01)

(52) U.S. Cl.
CPC .............. *H04Q 9/14* (2013.01); *H02S 50/10* (2014.12)

(58) Field of Classification Search
CPC ................................. H04Q 9/14; H02S 50/10
USPC .......... 324/761.01, 600, 500, 425, 434, 440, 324/450, 76.11, 76.37, 501, 639, 642, 702
See application file for complete search history.

(56) References Cited

U.S. PATENT DOCUMENTS

| | | | |
|---|---|---|---|
| 2009/0034159 A1 | 2/2009 | Froeschl et al. | |
| 2012/0161527 A1* | 6/2012 | Casey | H01L 31/02021 307/80 |
| 2014/0341235 A1* | 11/2014 | Tagashira | H04B 3/54 370/479 |

FOREIGN PATENT DOCUMENTS

WO    2014/140251 A1    9/2014

OTHER PUBLICATIONS

European patent application No. 17152614.8 extended European search report dated May 19, 2017 (7 pages).

* cited by examiner

*Primary Examiner* — Melissa Koval
*Assistant Examiner* — Trung Nguyen
(74) *Attorney, Agent, or Firm* — Conley Rose, P.C.

(57)    ABSTRACT

A method for uploading data of a cell panel monitoring system and a cell panel monitoring system are provided. The method includes: collecting parameter information of each string of photovoltaic cells in each of a plurality of cell panels of a photovoltaic system; modulating the parameter information into a pulse carrier signal; and loading the pulse carrier signal to a busbar of the photovoltaic system, where the busbar is connected in series with each of the cell panels; where parameter information of the cell panels is obtained by a server of the photovoltaic system through demodulation on receiving the pulse carrier signal, data uploaded in a preset time difference ΔT is determined as valid data, remaining data is discarded, and the server is connected in series in the busbar. A cell panel monitoring system is further provided.

12 Claims, 4 Drawing Sheets

“METHOD FOR UPLOADING DATA OF CELL PANEL MONITORING SYSTEM AND CELL PANEL MONITORING SYSTEM”,

METHOD FOR UPLOADING DATA OF CELL PANEL MONITORING SYSTEM AND CELL PANEL MONITORING SYSTEM

This application claims priority to Chinese Patent Application No. 201610091788.0, entitled "METHOD FOR UPLOADING DATA OF CELL PANEL MONITORING SYSTEM AND CELL PANEL MONITORING SYSTEM", filed on Feb. 17, 2016 with the State Intellectual Property Office of the People's Republic of China, which is incorporated herein by reference in its entirety.

TECHNICAL FIELD

The present disclosure relates to a method for uploading data and a system applying the method for uploading data, and in particular to a method for uploading data of a cell panel monitoring system and a cell panel monitoring system.

BACKGROUND

Safety performance of photovoltaic systems has attracted more and more attention, and components in the photovoltaic systems have become an important aspect of safety because of the huge number of the components. There is a lack of reliable and stable component-level monitoring and analysis systems in the market. In practical applications, for example, in a cloudy condition, as illumination changes dramatically, a great difference between uploading time of components may lead to asynchronous data, causing the data to be invalid. A method for uploading data in a conventional technology or product may be a host query method, which is slow and results in asynchronous data; or may be a method in which an average value or a cumulative sum of data over a period of time is uploaded, which results in a poor real-time performance and cannot reflect real-time changes.

SUMMARY

In view of the above, a method for uploading data of a cell panel monitoring system and a cell panel monitoring system are provided according to the present disclosure, so as to solve the following technical problems: 1. how to reduce a collision probability and calculate the collision probability; 2. how to obtain synchronous data.

The technical solution of the present disclosure is described as follows. A method for uploading data of a cell panel monitoring system is provided, which includes:

collecting parameter information of each string of photovoltaic cells in each of the cell panels of a photovoltaic system;

modulating the parameter information into a pulse carrier signal; and loading the pulse carrier signal to a busbar of the photovoltaic system, where the busbar is connected in series with each of the cell panels;

where parameter information of the cell panels is obtained by a server of the photovoltaic system through demodulation on receiving the pulse carrier signal, data uploaded in a preset time difference ΔT is determined as valid data, remaining data is discarded, and the server is connected in series in the busbar.

As a further improvement of the above technical solution, in a case that the cell panel monitoring system does not have a receiving function, the method further includes:

performing, by the cell panel monitoring system, system self-checking after the system meets a power-on condition;

detecting a transmission condition after the self-checking is successful; and calculating random delay time in a current transmission period in a case that the transmission condition is met;

where data transmission is performed by the cell panel monitoring system when transmission time is reached.

As a further improvement of the above technical solution, in a case that the cell panel monitoring system has a receiving function, the method further includes:

performing, by the cell panel monitoring system, system self-checking after the system meets a power-on condition;

detecting a transmission condition after the self-checking is successful; and sensing whether there is data transmitted on the busbar;

where data transmission is performed if there is no data transmitted on the busbar.

As a further improvement of the above technical solution, a collision probability k in a transmission period meets the following condition:

$$k = C_N^1 * \frac{T_1}{T_L} * C_N^1 * \frac{T_2}{T_L},$$

where N is the number of the cell panels, $T_L$ is the transmission period of the pulse carrier signal, $T_1$ is a minimum step size of a timer, and $T_2$ is a transmission time length of the pulse carrier signal.

As a further improvement of the above technical solution, the parameter information is a voltage, a current or a temperature.

A cell panel monitoring system is further provided according to the present disclosure, each of cell panels of a photovoltaic system is provided with the cell panel monitoring system, and the cell panel monitoring system includes:

several voltage collection circuits,
a controller, and
a transmission circuit;

where each string of photovoltaic cells of each of the cell panels is connected in parallel with one of the several voltage collection circuits, and each of the several voltage collection circuits is configured to collect parameter information of the corresponding string of photovoltaic cells and store the parameter information into the controller; and the transmission circuit is configured to transmit the collected corresponding parameter information to a busbar in a format determined by a protocol, i.e., in a form of a pulse carrier signal.

As a further improvement of the above technical solution, the cell panel monitoring system further includes a receiving circuit configured to sense and receive a signal on the busbar.

As a further improvement of the above technical solution, the cell panel monitoring system further includes several bypass diodes, each one of which is connected between two terminals of each string of photovoltaic cells in each of the cell panels.

As a further improvement of the above technical solution, the cell panel monitoring system is designed as a standard module for using as a universal module.

As a further improvement of the above technical solution, the cell panel monitoring system includes several pairs of parameter information collection terminals, a PV+ terminal and a PV− terminal; and two terminals of the transmission circuit are respectively connected to the PV+ terminal and the PV− terminal, and two terminals of each of the several voltage collection circuits are connected to one pair of the several pairs of parameter information collection terminals.

In the present disclosure, an intelligent monitoring method is adopted in each of the cell panels of the photovoltaic system. The collision probability is reduced through random data transmission, and data validity is ensured by a synchronous data uploading mechanism, thus achieving real-time monitoring and analyzing of the cell panels.

DETAILED DESCRIPTION

For a better understanding of the object, technical solutions and advantages of the present disclosure, the present disclosure is further described in detail in conjunction with drawings and embodiments. It should be understood that the specific embodiments described herein are merely for illustration of the invention and do not limit the invention.

Figure 1:
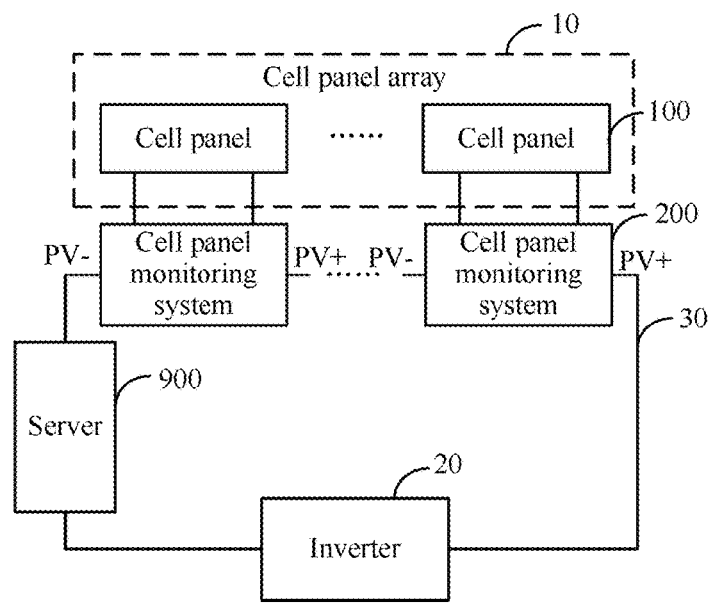
FIG. 1 is an overall schematic structural diagram of a cell panel monitoring system according to the present disclosure.

Referring to FIG. 1, a photovoltaic system includes a cell panel array 10, a server 900, an inverter 20 and a busbar 30. The cell panel array 10, the server 900, the inverter 20 and the busbar 30 are connected in series in a circuit. A direct current generated by the cell panels 100 is converted into an alternating current by the inverter 20, and the alternating current is inputted to an electrical grid. The cell panel array 10 may include multiple cell panels 100 connected in series.

Each of the multiple cell panels 100 in the cell panel array 10 is provided with a cell panel monitoring system 200 according to the present disclosure. The cell panel monitoring system 200 collects parameter information, such as a voltage, a current and a temperature, of each string of photovoltaic cells 101 in the corresponding one of the multiple cell panels 100, modulates the parameter information into a pulse signal and loads the pulse signal to the busbar 30. The server 900 connected in series in the busbar 30 demodulates the pulse signal as received, to obtain a status parameter of each of the cell panels 100.

Each of the cell panels 100 generally includes multiple photovoltaic cells 101 connected in series or in parallel. In order to prevent a photovoltaic cell 101 in abnormal operation from affecting an output of the entire cell panel 100, a bypass diode 102 may be connected between two terminals of the multiple photovoltaic cells 101.

Figure 2:
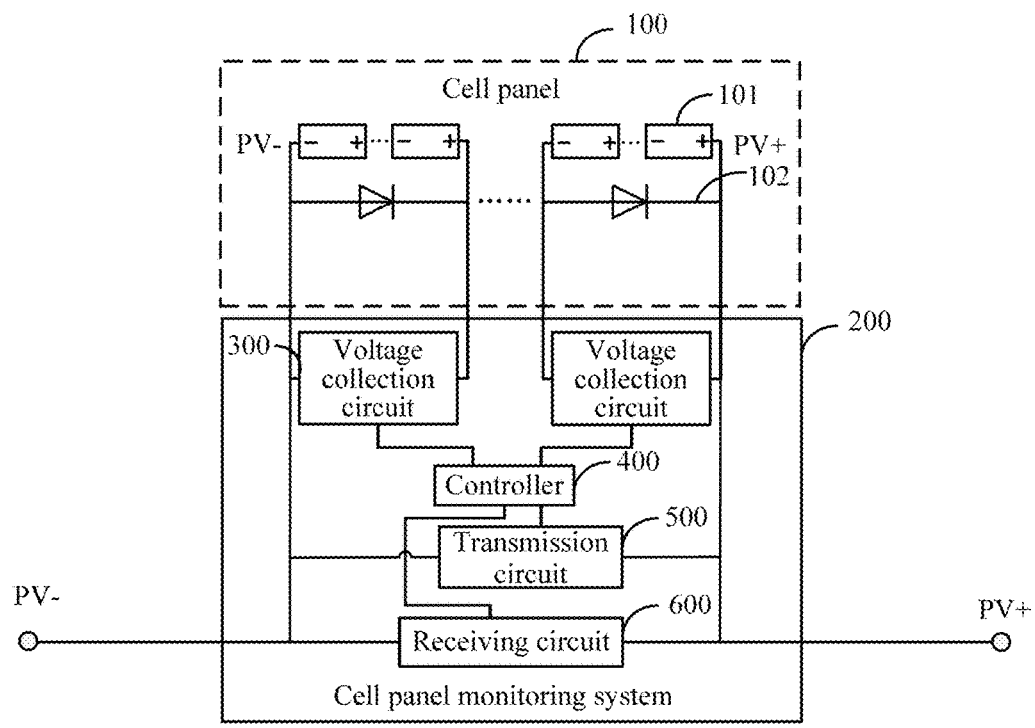
FIG. 2 is a schematic structural diagram of a cell panel monitoring system with a receiving function.

Referring to FIG. 2, the cell panel monitoring system 200 may include several voltage collection circuits 300, a controller 400, a transmission circuit 500 and a receiving circuit 600.

Figure 3:
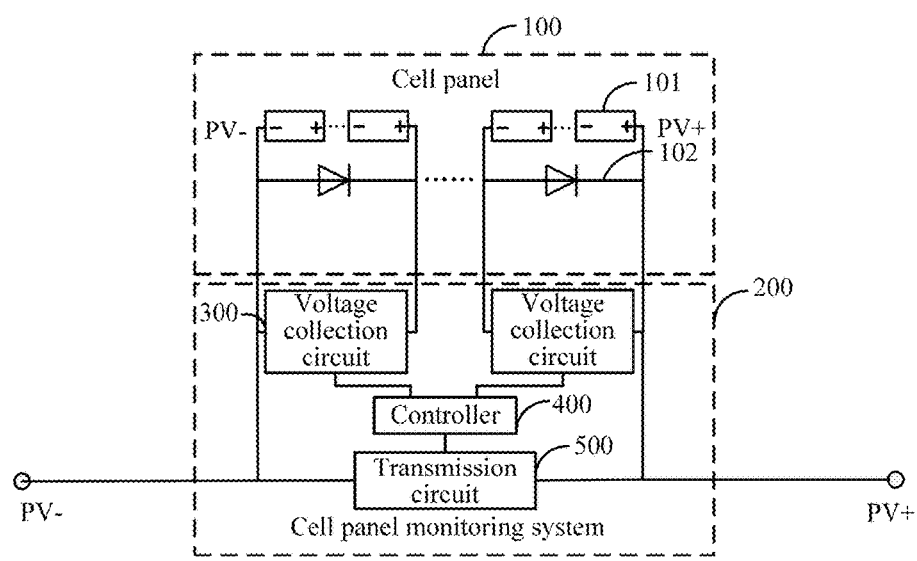
FIG. 3 is a schematic structural diagram of a cell panel monitoring system without a receiving function.

Each string of photovoltaic cells 101 in each of the multiple cell panels 100 is connected in parallel with one of the several voltage collection circuits 300. Each of the several voltage collection circuits 300 is configured to collect the parameter information of the corresponding string of photovoltaic cells 101, and store the parameter information into the controller 400. The transmission circuit 500 is configured to transmit the collected corresponding parameter information to the busbar 30 in a format determined by a protocol, i.e., in a form of a pulse carrier signal. The receiving circuit 600 is configured to sense and receive a signal on the busbar 30. In other embodiments, the cell panel monitoring system 200 may not be provided with the receiving circuit 600, as shown in FIG. 3.

Each of the voltage collection circuits 300 is configured to collect the parameter information of each string of photovoltaic cells 101 and store the parameter information into the controller 400. The transmission circuit 500 is configured to transmit the collected parameter information, such as a voltage, a current or a temperature, to the busbar in the format determined by the protocol. The receiving circuit 600 is configured to sense and receive a signal on the busbar.

Figure 4:
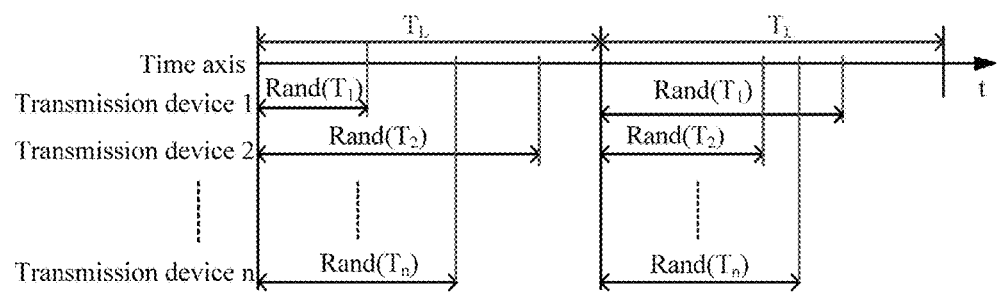
FIG. 4 is a schematic diagram of calculating a collision probability of the cell panel monitoring system shown in FIG. 1.

Referring to FIG. 4, the controller 400 performs system self-checking after the system meets a power-on condition, detects a transmission condition after the self-checking is successful, and calculates random delay time in a current transmission period in a case that the transmission condition is met. Data transmission is performed when transmission time is reached. A transmission period $T_L$ may be set by an external device via a carrier receiving circuit.

A collision probability k in the transmission period meets the following condition:

$$k = C_N^1 * \frac{T_1}{T_L} * C_N^1 * \frac{T_2}{T_L},$$

where N is the number of the cell panels, $T_L$ is the transmission period, $T_1$ is a minimum step size of a timer, and $T_2$ is a transmission time length. Taking 25 cell panels per string as an example, the transmission period $T_L$ is 1 s, the minimum step size $T_1$ of the timer is 1 ms, and the transmission time length $T_2$ is 2 ms, then the collision probability is 1.2% by calculation.

Figure 5:
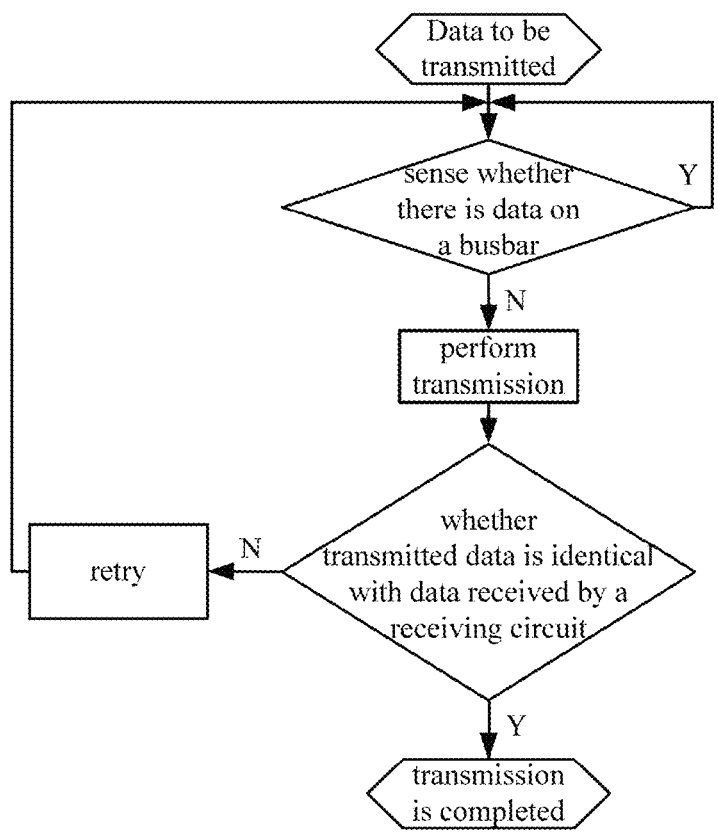
FIG. 5 is a flow chart of data transmission of the cell panel monitoring system with a receiving function shown in FIG. 2.

Reference is made to FIG. 5, which is a flow chart of data transmission of the cell panel monitoring system 200 provided with the receiving circuit 600. The busbar 30 is sensed in a case that the system meets the transmission condition. In a case that the busbar is idle, that is, there is no other cell panel monitoring system 200 of a same string transmitting data, data of the cell panel monitoring system 200 is transmitted. The data is compared with received data. The transmission is determined as successful in a case that the data is identical with the received data, otherwise, the data is sent again. In a case that the busbar is busy, that is, there is data transmitted by other cell panel monitoring system 200 on the busbar 30, the cell panel monitoring system waits until the busbar 30 is idle.

Figure 6:
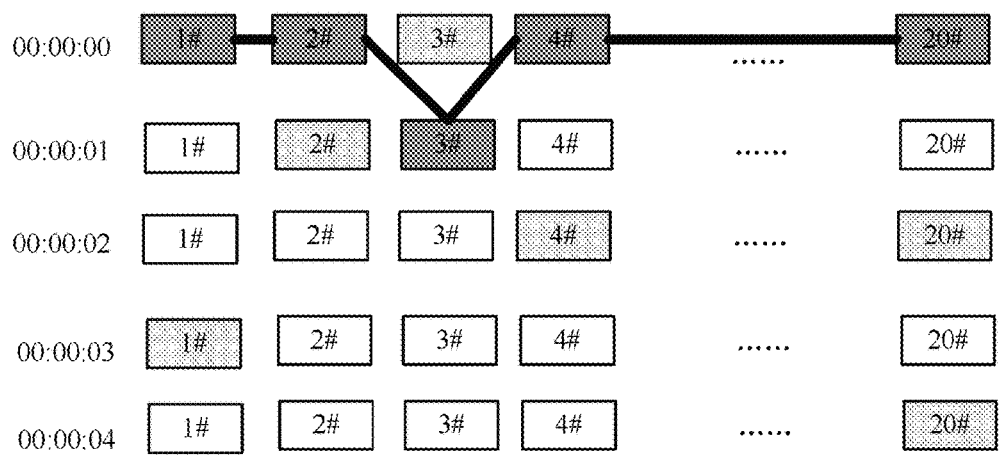
FIG. 6 is a schematic diagram of realizing synchronous data acquisition of the cell panel monitoring system with a receiving function shown in FIG. 2.

FIG. 6 shows a condition of uploading data in ΔT (5 S). The total number of components (i.e. the photovoltaic cells 101) in one string is 20. Colorless blocks represent successfully uploaded data, and gray blocks represent unsuccessfully uploaded data. At a zeroth second, a third block of data is not successfully uploaded, and the other 19 blocks of data are successfully uploaded. At a first second, a second block of data is not successfully uploaded, and the other 19 blocks of data are successfully uploaded. At a second second, a fourth block of data and a twentieth block of data are not successfully uploaded, and the other 18 blocks of data are successfully uploaded. At a third second, a first block of data is not successfully uploaded, and the other 19 blocks of data are successfully uploaded. At a fourth second, a twentieth block of data is not successfully uploaded, and the other 19 blocks of data are successfully uploaded. After the server 900 receives the above string of data uploaded by the cell panel monitoring system 200, in order to obtain valid data for data analysis, data represented by black blocks in the Figure, i.e., 19 blocks of data represented by the first, second and the fourth to twentieth blocks of the zeroth second and data represented by the third block of the first second, are obtained, and the 20 blocks of data are determined as the valid data. The valid data is time stamped for data analysis. The smaller the value of ΔT is, the better the real-time performance of the data is.

A function of the cell panel monitoring system 200 is to collect a parameter, such as a voltage or a temperature, of each string of photovoltaic cells 101 of each of the multiple cell panels 100, and to convert the parameter into a predetermined data format according to the protocol. A switch circuit is controlled, by an output pin of the timer of the controller 400, to superimpose the pulse signal to the busbar 30. On receiving the pulse signal, the server 900 demodulates the pulse signal, to obtain parameter information, such as a voltage or a temperature, of the multiple cell panels 100.

The cell panel monitoring system 200 can be divided into two types, i.e., a type with the receiving circuit 600 and a type without the receiving circuit 600. The cell panel monitoring system 200 without the receiving circuit 600 performs system self-checking after the system meets the power-on condition, detects the transmission condition after the self-checking is successful, and calculates the random delay time in the current transmission period in a case that the transmission condition is met. Data transmission is performed when the transmission time is reached. By calculation, the collision probability can be maintained at a very low level.

The cell panel monitoring system 200 with the receiving circuit 600 performs system self-checking after the system meets the power-on condition, detects the transmission condition after the self-checking is successful, senses whether there is data transmitted on the busbar, waits if there is data transmitted on the busbar. Data transmission is performed until the busbar 30 is idle, thereby further reducing the collision possibility.

On receiving uploaded data, the server 900 determines data uploaded in ΔT as the valid data and discards remaining data. In this way, data invalidation caused by inconsistent data upload time in a case that illumination changes dramatically can be avoided.

The above descriptions are only preferred embodiments of the invention and are not to limit the invention. Any changes, equivalents and modifications which are made within the spirit and principle of the present disclosure shall fall within the protection scope of the present disclosure.

What is claimed is:

1. A method for uploading data of a cell panel monitoring system, comprising:
    collecting parameter information of each string of photovoltaic cells in each cell panel of a photovoltaic system;
    modulating the parameter information into a pulse carrier signal; and
    loading the pulse carrier signal to a busbar of the photovoltaic system, wherein the busbar is connected in series with each of the cell panels;
    wherein parameter information of the cell panels is obtained by a server of the photovoltaic system through demodulation on receiving the pulse carrier signal, data uploaded in a preset time difference ΔT is determined by the server as valid data, remaining data is discarded, and the server is connected in series in the busbar, and
    wherein real-time performance of the data improves as a value of the preset time difference ΔT decreases.

2. The method for uploading data of a cell panel monitoring system according to claim 1, wherein in a case that a receiving function is exclusive in the cell panel monitoring system, the method further comprises:
    performing, by the cell panel monitoring system, system self-checking after the system meets a power-on condition;
    detecting a transmission condition after the self-checking is successful; and
    calculating random delay time in a current transmission period in a case that the transmission condition is met;
    wherein data transmission is performed by the cell panel monitoring system when transmission time is reached.

3. The method for uploading data of a cell panel monitoring system according to claim 1, wherein in a case that the cell panel monitoring system has a receiving function, the method further comprises:
    performing, by the cell panel monitoring system, system self-checking after the system meets a power-on condition;
    detecting a transmission condition after the self-checking is successful; and
    sensing whether there is data transmitted on the busbar;
    wherein data transmission is performed if there is no data transmitted on the busbar.

4. The method for uploading data of a cell panel monitoring system according to claim 1, wherein a collision probability k in a transmission period meets the following condition:

$$k = C_N^1 * \frac{T_1}{T_L} * C_N^1 * \frac{T_2}{T_L},$$

wherein N is the number of the cell panels, $T_L$ is the transmission period of the pulse carrier signal, $T_1$ is a minimum step size of a timer, and $T_2$ is a transmission time length of the pulse carrier signal.

5. The method for uploading data of a cell panel monitoring system according to claim 1, wherein the parameter information is a voltage, a current or a temperature.

6. A data uploading system comprising a plurality of cell panel monitoring systems and a server, wherein each cell panel of a photovoltaic system is provided with one of the cell panel monitoring systems, and wherein each cell panel monitoring system comprises:
    a plurality of voltage collection circuits,
    a controller, and
    a transmission circuit;
    wherein each string of photovoltaic cells of each of the cell panels is connected in parallel with one of the plurality of voltage collection circuits, and each of the plurality of voltage collection circuits is configured to collect parameter information of the corresponding string of photovoltaic cells and stores the parameter information into the controller;
    wherein the transmission circuit is configured to transmit the collected corresponding parameter information to a busbar in a form of a pulse carrier signal;

wherein the server is configured to obtain parameter information of the cell panels through demodulation of the pulse carrier signal, data uploaded in a preset time difference ΔT is determined by the server as valid data, and remaining data is discarded;

wherein the server is connected in series in the busbar; and wherein real-time performance of the data improves as a value of the preset time difference ΔT decreases.

7. The data uploading system according to claim 6, wherein each cell panel monitoring system comprises a receiving circuit configured to sense and receive a signal on the busbar.

8. The data uploading system according to claim 6, wherein each cell panel monitoring system comprises a plurality of bypass diodes, each one of which is connected between two terminals of each string of photovoltaic cells in each of the cell panels.

9. The data uploading system according to claim 6, wherein the cell panel monitoring system is designed as a standard module for using as a universal module.

10. The data uploading system according to claim 9, wherein each cell panel monitoring system comprises:
a plurality of pairs of parameter information collection terminals,
a PV+ terminal, and
a PV− terminal;
wherein two terminals of the transmission circuit are respectively connected to the PV+ terminal and the PV− terminal; and
two terminals of each of the plurality of voltage collection circuits are connected to one pair of the pairs of parameter information collection terminals.

11. The data uploading system according to claim 6, wherein when a receiving function is exclusive in the cell panel monitoring system, the controller is further configured to:
perform system self-checking after the system meets a power-on condition;
detect a transmission condition after the self-checking is successful; and
calculate a random delay time in a current transmission period when the transmission condition is met,
wherein data transmission is performed by the cell panel monitoring system when transmission time is reached.

12. The data uploading system according to claim 6, wherein when the cell panel monitoring system has a receiving function, the cell panel monitoring system is configured to:
perform system self-checking after the system meets a power-on condition;
detect a transmission condition after the self-checking is successful; and
sense whether data are transmitted on the busbar,
wherein data transmission is performed if there is no data transmitted on the busbar.

\* \* \* \* \*